E. PARKINSON.
PROTECTION OF LUBRICATING HOLES IN MACHINES.
APPLICATION FILED AUG. 10, 1915.

1,187,777.

Patented June 20, 1916.

Inventor:
Ernest Parkinson.
by Spear, Middleton, Donaldson & Spear
Attys.

UNITED STATES PATENT OFFICE.

ERNEST PARKINSON, OF SHIPLEY, ENGLAND.

PROTECTION OF LUBRICATING-HOLES IN MACHINES.

1,187,777. Specification of Letters Patent. Patented June 20, 1916.

Application filed August 10, 1915. Serial No. 44,814.

*To all whom it may concern:*

Be it known that I, ERNEST PARKINSON, a subject of the King of Great Britain and Ireland, and resident of Moor Head, Shipley, in the county of York, England, have invented a certain new and useful Improvement Relating to the Protection of Lubricating-Holes in Machines, of which the following is a specification.

This invention has for its object the provision of means whereby the lubricating holes of machines are protected from grit and the like, and the waste of oil caused by overflowing reduced. Each lubricating hole is provided with a metallic plug capable of expansion and contraction, and so arranged that, when inserted into a lubricating hole, it is frictionally held within the hole, and providing the said hole be filled with oil, on inserting the plug, very little of the oil is displaced and wasted by overflowing, in comparison to the waste when solid cylindrical plugs are used for protecting the holes.

In describing my invention in detail, reference is made to the accompanying sheet of drawings, in which—

Figure 1:
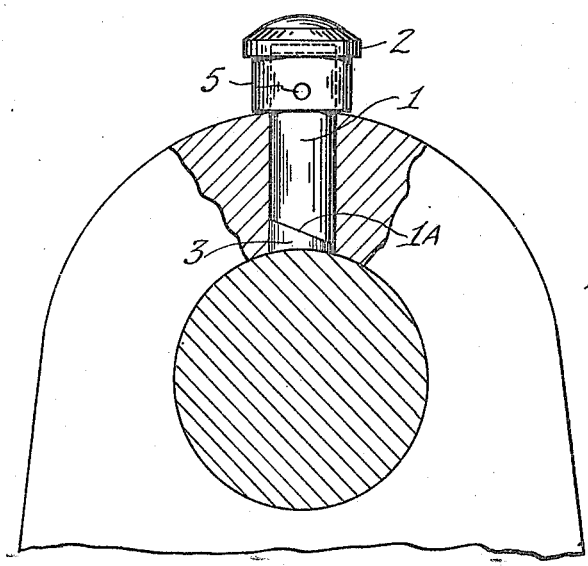
Figure 3:
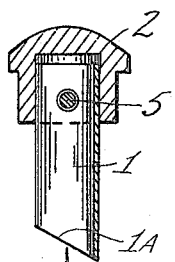
Figure 2:
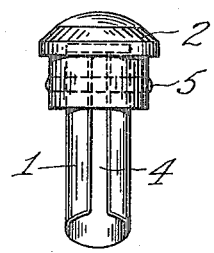
Figure 4:
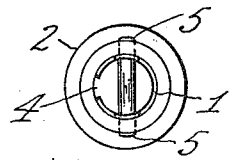

Figure 1 represents an elevation partly in section of a machine journal provided with a protector made in accordance with my invention. Fig. 2 is a detached elevation of the protector. Fig. 3 is a sectional elevation of the protector looking at right angles to that shown by Fig. 2. Fig. 4 is an end view looking in the direction of arrow; the remaining figures are hereinafter referred to.

Figure 5:
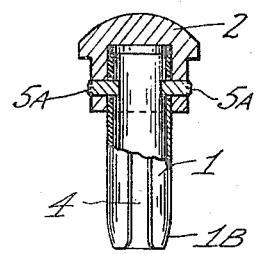
Figure 6:
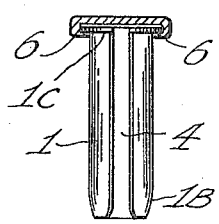

My object is carried out by forming a metallic sleeved or hollow plug 1, provided at one end with an enlargement or what may be termed a protector head such as 2 or its equivalent, the head being of sufficient diameter to cover the lubricating hole 3. The metallic plug 1 is hollow, and when removed from the lubricating hole, it expands to a larger diameter than that of the said hole. One end of the plug may be formed at a slanting angle 1$^A$ or it may be compressed in diameter somewhat as shown at 1$^B$, see Fig. 5. By either of these arrangements, the end of the hollow plug is adapted to more readily engage with, and be pressed into a lubricating hole 3. The hollow plug 1 is slit longitudinally at 4 its entire length, and may be secured to an enlargement such as 2 by a pin 5 forced through holes bored in the enlargement, the pin passing freely through holes in the hollow plug 1, or it may be freely connected to the enlargement 2 by short pins or projections 5$^A$, as shown by Fig. 5. The hollow plug may be freely connected to the enlargement in a modified manner by the inturning of same at 6, to freely engage with the flange 1$^C$ of hollow plug, see Fig. 6, in any case, however, the hollow plug and enlargement are connected, the plug is slit for its entire length and free to contract.

By connecting the hollow plug to an enlargement in the manner described, the plug is free to be compressed for its entire length to the diameter that it may be readily inserted into a lubricating hole 3, in which it is retained by the automatic expansion of plug.

By forming a protecting plug as described, it will be obvious, should the lubricating hole 3 be filled with oil, on inserting the hollow plug into the hole, very little of the oil will be displaced and caused to overflow, by reason of the oil entering the hollow space of plug, and the slit 4 allowing the air to escape from the interior of plug, in contra-distinction to the oil being displaced by the introduction of solid cylindrical plugs, such as are commonly used for protecting the lubricating holes of shaft journals in machines.

What I claim as my invention is:—

A protecting device for lubricating holes in machines comprising a split tube with a head loosely connected thereto whereby the tube is free to contract and expand its whole length when inserted or withdrawn from the lubricating opening, substantially as described.

In witness whereof, I have hereunto set my hand to this specification in the presence of two witnesses.

ERNEST PARKINSON.

Witnesses:
JOHN GILL,
ETHEL M. SMITH.

Copies of this patent may be obtained for five cents each, by addressing the "Commissioner of Patents, Washington, D. C."